United States Patent [19]

Hall

[11] Patent Number: 5,483,922
[45] Date of Patent: Jan. 16, 1996

[54] APPARATUS FOR DETECTING WHEN BIRDS ARE IN A BIRDHOUSE

[76] Inventor: Lance S. Hall, 840 Newport #200, Newport Beach, Calif. 92660

[21] Appl. No.: 412,638

[22] Filed: Mar. 29, 1995

[51] Int. Cl.⁶ ................................................. A01K 31/14
[52] U.S. Cl. ............................ 119/23; 340/565; 340/573; 119/163
[58] Field of Search .................... 119/23, 52.2, 52.3, 119/57.8, 57.9, 163, 164, 45.1, 45.2; 340/573, 565

[56] References Cited

U.S. PATENT DOCUMENTS

| | | | |
|---|---|---|---|
| 3,734,057 | 5/1973 | Lee et al. ................................. | 119/163 |
| 3,811,410 | 5/1974 | Roberts .................................... | 119/163 |
| 4,729,342 | 3/1988 | Loctin ...................................... | 119/163 |
| 5,168,830 | 12/1992 | Deglis ..................................... | 119/23 |

*Primary Examiner*—Todd E. Manahan
*Attorney, Agent, or Firm*—Alfred E. Hall

[57] ABSTRACT

Apparatus for detecting when birds are in a birdhouse with a heat sensor and illuminating a lamp to give a visual indication of the presence of the bird. A second portion of the circuit gives a visual indication when the bird enters or leaves the birdhouse.

5 Claims, 1 Drawing Sheet

APPARATUS FOR DETECTING WHEN BIRDS ARE IN A BIRDHOUSE

BACKGROUND OF THE INVENTION

1. Field of the Invention

The present invention relates in general to apparatus for detecting the presence of a warm-blooded mammal in an enclosed location and in particular to apparatus for detecting the presence of a bird or birds in a birdhouse.

2. Description of Related Art

Ornithologist and bird lovers in general are interested in knowing when birds have occupied a birdhouse and they spend many hours watching birds come and go and are interested in knowing when the birds are sitting on the nest and the like. It would be of assistance if the presence of the bird could cause a visual or audible indication so that an individual would know that the bird has entered the birdhouse or is on the nest.

SUMMARY OF THE INVENTION

The present invention provides detecting apparatus for detecting when a bird is in the birdhouse sitting on the nest. A visual indicator such as a light-emitting diode or an audible system is provided whereby an observer will know when the bird is in the birdhouse.

In addition, a circuit is provided that gives the visual indication when the bird has entered or left the birdhouse.

Thus, it is an object of the present invention to provide an apparatus for detecting when birds are in the birdhouse.

It is also an object of the present invention to provide a visual indication when birds enter or leave the birdhouse.

BRIEF DESCRIPTION OF THE DRAWINGS

These and other objects of the present invention will be more fully disclosed when taken in conjunction with the following DETAILED DESCRIPTION OF THE DRAWINGS in which like numerals represent like elements and in which.

DETAILED DESCRIPTION OF THE DRAWINGS

Figure 1:
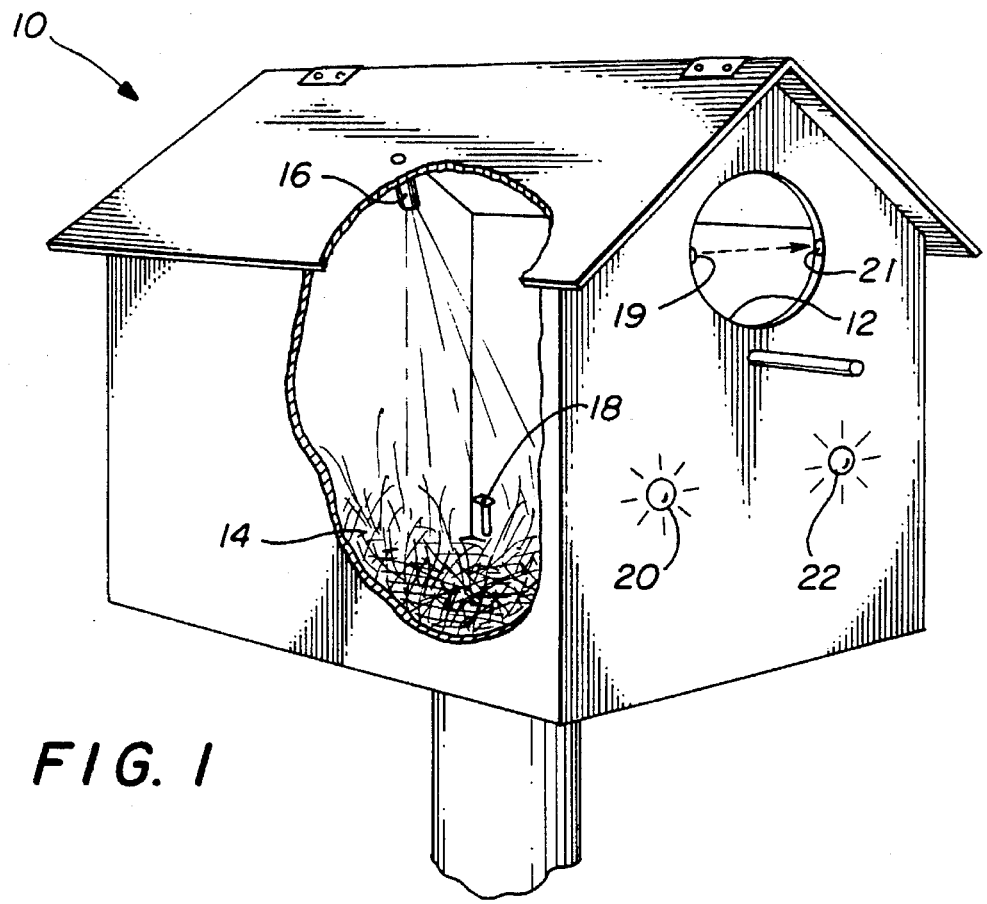
FIG. 1 is an isometric view of a birdhouse in partial cross section illustrating a nest inside and the appropriate detectors for detecting the presence of a bird and also illustrating the detectors at the entrance to the birdhouse to provide a visual indication as to when the birds enter and leave the birdhouse.

FIG. 1 is an isometric view of a birdhouse 10 with a partial section removed to reveal the interior of the birdhouse 10. The birdhouse 10 has an opening 12 for the bird to enter and leave. It also has a nest 14 with an infrared heat detecting device 16, well known in the art, mounted in any desired location in the birdhouse but shown in the roof for detecting the body heat of the bird and generating a signal. In like manner, a second heat sensor 18 is mounted in, or out of, the birdhouse and away from the immediate vicinity of the nest such as in a corner of the birdhouse to detect ambient temperature. A light device 20 such as a light-emitting diode provides an indication when detector 16 detects a presence of a bird in the birdhouse.

The entrance 12 also has infrared devices 19 and 21 appropriately positioned to provide a beam across the entrance 12 such that, if the beam is broken, light 22 is energized for a predetermined period of time, thus indicating that a bird has entered or left the birdhouse 10.

Figure 2:
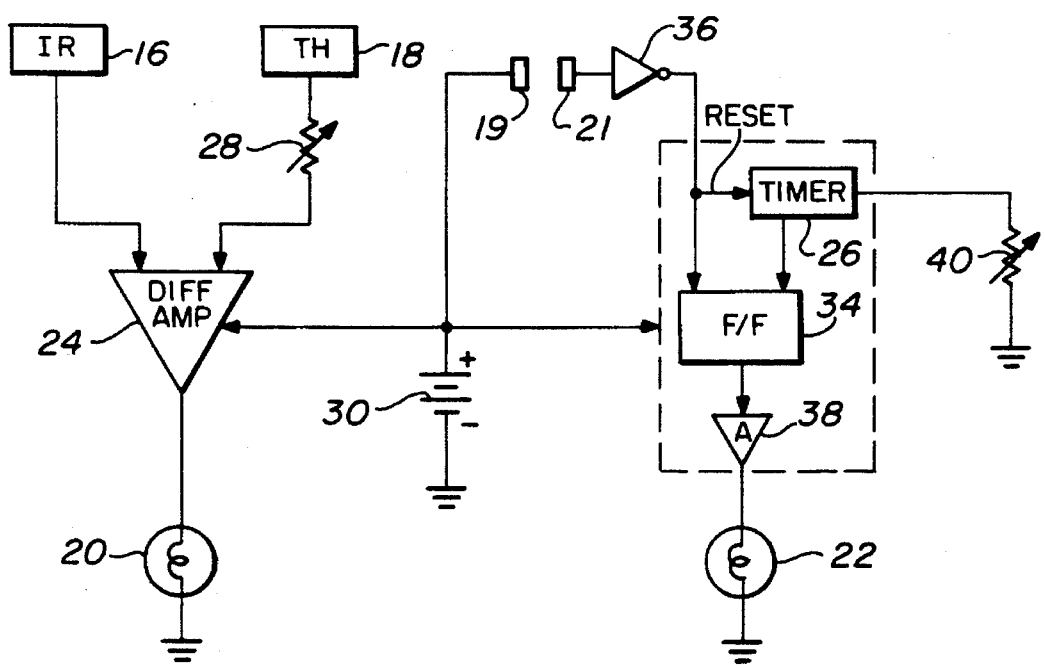
FIG. 2 is a schematic diagram of the electrical circuit necessary to provide the indication that the bird is in the birdhouse or is entering or leaving.

The circuit in FIG. 2 illustrates how the apparatus functions. The output from infrared detector 16 and the other heat detector 18, which may be a thermocouple, a thermistor, or any other suitable type of heat detector well known in the art, are connected to a differential amplifier 24. An adjusting resistor 28 may be placed in the connection between the second heat sensor 18 and the differential amplifier 24 and is variable so that at ambient temperature, with no birds in the birdhouse, no output is produced from the differential amplifier 24. When a bird enters the birdhouse, the presence is detected by infrared sensor 16 which increases its output much faster than the heat detector 18 and causes the differential amplifier 24 to produce an output that illuminates light 20. Battery 30 supplies the power for the differential amplifier and the light 20. Thus, whenever the bird is in the birdhouse, the difference in the temperature detected by the IR detector 16 and the second ambient temperature detector 18 causes differential amplifier 24 to illuminate light 20.

If it is desired to know when the bird is entering and leaving the birdhouse, the second portion of the circuit can be utilized with the IR transmitter 19 and receiver 21, which provides the continuous beam across the entrance 12 of the birdhouse. The output of the detector 21 is coupled to an inverter 36 so that there is no output to flip-flop 34 during normal conditions. When a bird breaks the beam between the transmitter 19 and receiver 21, the beam is momentarily interrupted and inverter 36 produces an output which sets flip-flop 34. The output of flip-flop 34 is coupled to an amplifier 38, which illuminates the light 22. At the same time, the output of inverter 36 sets timer 26, the time interval of which can be adjusted by variable resistor 40 so that after a predetermined period of time flip-flop 34 is reset, the light 22 is turned OFF and the flip-flop 34 waits for the next movement of the bird through the entrance 12. Thus, the light 22 is then extinguished when the timer 26 resets the flip-flop. Battery 30 provides power to the circuit 32 for laminating lamp 22 when a bird enters or leaves the birdhouse.

All of the components utilized in the circuit shown in FIG. 2 are shelf-available components and are well known in the art.

Thus, there has been disclosed a novel apparatus for detecting the presence of a bird in a birdhouse and providing a visual indication thereof. The novel apparatus also provides an indication that a bird has entered or left the birdhouse.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. Apparatus for detecting when birds are in a birdhouse comprising:

a birdhouse;

a first heat sensor and a second heat sensor positioned in said birdhouse;

a differential amplifier connected to said first and second heat sensors to produce an output signal only when a bird is in said birdhouse; and a lamp mounted external to said birdhouse and coupled to said differential amplifier output to emit a light when said differential amplifier output is received to indicate that a bird is in said birdhouse.

2. An apparatus as in claim 1 wherein:

said first heat sensor is an infrared sensor; and said second heat sensor is a thermistor.

3. An apparatus as in claim 1 further including a current adjusting device coupled to one of said sensors to adjust the output of said differential amplifier to zero at ambient temperature with no bird in the birdhouse.

4. An apparatus as in claim 1 further including:

an entrance to said birdhouse;

detector for generating a signal whenever a bird passes through said entrance; and a lamp circuit coupled to said detector for lighting a lamp when said bird passes through said birdhouse entrance.

5. An apparatus as in claim 1 wherein one of said heat detectors detects the heat of a bird that enters the birdhouse at a faster rate than the other such that the differential amplifier will produce an output.

* * * * *